United States Patent
Ban (10) Patent No.: US 7,557,752 B2
(45) Date of Patent: Jul. 7, 2009

(54) APPARATUS AND METHOD FOR COMMUNICATION

(75) Inventor: Koichiro Ban, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 173 days.

(21) Appl. No.: 11/837,104

(22) Filed: Aug. 10, 2007

(65) Prior Publication Data

US 2008/0150803 A1    Jun. 26, 2008

(30) Foreign Application Priority Data

Dec. 26, 2006 (JP) ............................. 2006-350403

(51) Int. Cl.
*G01S 3/16* (2006.01)
*H01Q 3/22* (2006.01)

(52) U.S. Cl. ..................... 342/383; 342/375

(58) Field of Classification Search .............. 342/383, 342/375
See application file for complete search history.

(56) References Cited

U.S. PATENT DOCUMENTS

| 5,103,495 A * | 4/1992 | Goutzoulis .................. 385/15 |
| 7,010,049 B1 * | 3/2006 | Jones et al. .................. 375/259 |
| 2006/0188034 A1 * | 8/2006 | Sampath ..................... 375/260 |
| 2007/0058743 A1 * | 3/2007 | Hunton ....................... 375/260 |
| 2007/0147533 A1 * | 6/2007 | Thomas et al. .............. 375/267 |

FOREIGN PATENT DOCUMENTS

JP      2002-368714      12/2002

\* cited by examiner

*Primary Examiner*—Thomas H Tarcza
*Assistant Examiner*—Harry Liu
(74) *Attorney, Agent, or Firm*—Oblon, Spivak, McClelland, Maier & Neustadt, P.C.

(57) ABSTRACT

There is provided a communication method including: generating a channel estimated value for each antenna by performing channel estimation using a received signal by each antenna; calculating reception weights by which subcarriers assigned the received signal of each antenna are to be multiplied using a set of the channel estimated values; calculating a reception weight time profile for each antenna by converting the reception weights calculated for each antenna to data on a time domain; generating a transmission weight time profile for each antenna by extracting a certain section of each reception weight time profile; calculating transmission weights by which subcarriers assigned a transmission signal for each antenna are to be multiplied by converting each transmission weight time profile to data on a frequency domain; and multiplying subcarriers assigned the transmission signal for each antenna by the transmission weights of each antenna and transmit multiplied subcarriers through each antenna.

20 Claims, 6 Drawing Sheets

APPARATUS AND METHOD FOR COMMUNICATION

CROSS REFERENCE TO RELATED APPLICATIONS

This application is based upon and claims the benefit of priority from the prior Japanese Patent Applications No. 2006-350403, filed on Dec. 26, 2006; the entire contents of which are incorporated herein by reference.

BACKGROUND OF THE INVENTION

1. Field of the Invention

The present invention relates to an apparatus and a method of sending/receiving an OFDM signal, and more particularly, for example, to a transmission beam forming method.

2. Related Art

An example of a transmission beam forming scheme for an OFDM signal is a scheme for calculating reception weights (amplitude and phase) for combining signals from respective antennas at a maximum ratio in such a way that a signal-to-noise power ratio of a received signal reaches a maximum for each subcarrier and using these reception weights as transmission weights (e.g., see JP-A 2002-368714 (Kokai)).

According to a transmission beam forming method based on such a conventional OFDM scheme, when behavior of noise and interference varies from one subcarrier to another, if weights used for reception combining are applied as transmission weights as is, a delay profile (time response) of a channel is temporally extended considerably, resulting in a problem that the delay profile does not fall within a guard interval.

Furthermore, when pilots do not exist in all subcarriers, interference occurs due to influences of aliasing (overlap), resulting in a problem that a receiver cannot estimate the channel correctly.

SUMMARY OF THE INVENTION

According to an aspect of the present invention, there is provided with a communication apparatus provided with a plurality of antennas and using a multicarrier transmission scheme as a transmission scheme, comprising:

a plurality of channel estimating units configured to be arranged correspondingly to the plurality of the antennas and configured to generate a channel estimated value for each antenna by performing channel estimation using a received signal acquired by each antenna;

a plurality of reception weight calculators configured to calculate reception weights by which subcarriers assigned the received signal of each antenna are to be multiplied using a set of the channel estimated values generated by the plurality of channel estimating units;

a plurality of reception weight profile calculators configured to calculate a reception weight time profile for each antenna by converting the reception weights calculated for each antenna to data on a time domain;

a plurality of transmission weight profile calculators configured to generate a transmission weight time profile for each antenna by extracting a certain section of the reception weight time profile calculated for each antenna;

a plurality of transmission weight calculators configured to calculate transmission weights by which subcarriers assigned a transmission signal for each antenna are to be multiplied by converting the transmission weight time profile calculated for each antenna to data on a frequency domain; and a plurality of transmitting units configured to multiply subcarriers assigned the transmission signal for each antenna by the transmission weights calculated for each antenna and transmit subcarriers multiplied by the transmission weights through each antenna.

According to an aspect of the present invention, there is provided with a communication method performed in a communication apparatus provided with a plurality of antennas and using a multicarrier transmission scheme as a transmission scheme, comprising:

generating a channel estimated value for each antenna by performing channel estimation using a received signal acquired by each antenna;

calculating reception weights by which subcarriers assigned the received signal of each antenna are to be multiplied using a set of the channel estimated values for the antennas;

calculating a reception weight time profile for each antenna by converting the reception weights calculated for each antenna to data on a time domain;

generating a transmission weight time profile for each antenna by extracting a certain section of the reception weight time profile calculated for each antenna;

calculating transmission weights by which subcarriers assigned a transmission signal for each antenna are to be multiplied by converting the transmission weight time profile calculated for each antenna to data on a frequency domain; and multiplying subcarriers assigned the transmission signal for each antenna by the transmission weights calculated for each antenna and transmit subcarriers multiplied by the transmission weights through each antenna.

DETAILED DESCRIPTION OF THE INVENTION

Hereinafter, an embodiment of the present invention will be explained in detail with reference to the attached drawings.

Figure 1:
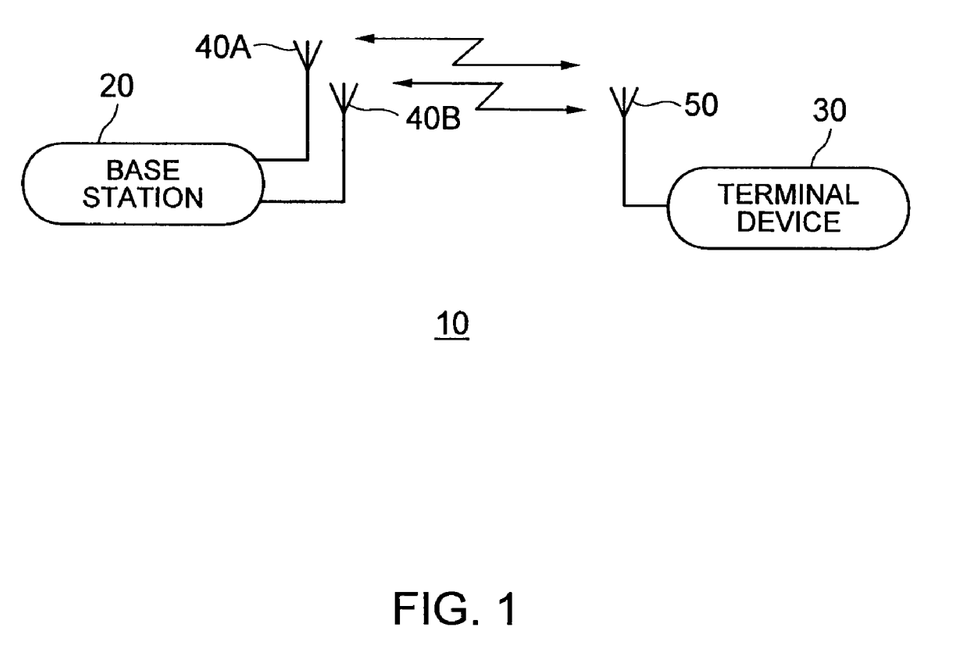
FIG. 1 shows a configuration example of a radio communication system made up of a base station and a terminal device according to an embodiment of the present invention.

FIG. 1 shows a radio communication system 10 according to this embodiment made up of a base station 20 provided with a plurality of antennas 40A and 40B and a terminal device 30 provided with an antenna 50. An uplink communication from the terminal device 30 to the base station 20 and a downlink communication from the base station 20 to the terminal device 30 are multiplexed based on a TDD (time division duplex) scheme and an OFDM (orthogonal frequency division multiplexing) scheme for carrying out data transmission using a plurality of subcarriers orthogonal to each other is used as a transmission scheme between the terminal device 30 and the base station 20.

Channels for uplink communication and downlink communication based on the TDD scheme have symmetry (reciprocity). The base station 20 can use uplink channel information estimated from a received signal as downlink channel information taking advantage of the symmetry of channels. Using this, it is possible to make use of information such as a reception weight (amplitude and phase) of reception beam forming when realizing transmission beam forming.

For example, the base station 20 transmits each subcarrier multiplied by a reception weight of the same subcarrier as a transmission weight for transmission. This allows the terminal device to receive signals combined through the downlink channel. However, in a cellular system based on an OFDM communication system in which behavior of interference changes every subcarrier, applying an independent transmission weight to each subcarrier or each subcarrier group lowers a correlation between subcarriers in the channel in an OFDM signal subjected to transmission beam forming received by the terminal device 30, causing the terminal device 30 to perform independent channel estimation for each subcarrier, which may lead to quality degradation of channel estimation and an increase of overhead.

The terminal device 30 can preferably perform channel estimation without being aware of the transmission beam forming at the base station 20 and a terminal device configuration that would cause the method of estimating a channel to change depending on the presence/absence of transmission beam forming or the like is not desirable. Generally, when channel estimation is performed, a better estimation characteristic is often obtained through delay profile estimation by limiting a delay profile (time response) of a channel to a finite time length rather than independently estimating a frequency response for each subcarrier.

An OFDM communication system is normally designed so as to prevent interference between symbols by setting a guard interval length which is greater than the length of a delay profile of a channel. That is, when the terminal device 30 estimate a channel, the channel is estimated assuming that the length of the delay profile is equal to or less than the guard interval length.

Another factor of limiting the length of a delay profile in channel estimation is a subcarrier interval (frequency interval) at which pilot data which is known data necessary to perform channel estimation is inserted. When, for example, one piece of pilot data is arranged per P subcarriers, the length of a delay profile which can be estimated correctly without being affected by aliasing (overlap) is 1/P of the length of an OFDM symbol. In this way, the frequency interval at which minimum necessary pilot data is inserted is also determined according to the length of the delay profile of the channel. In a normal OFDM system, the guard interval length is often shorter than 1/P of the length of an OFDM symbol.

As shown above, it can be said to be a necessary operation for the terminal device 30 to perform channel estimation assuming that the delay profile of the channel should fall within a predetermined time range according to the guard interval length and the subcarrier interval of pilot data. That is, when applying transmission beam forming, the base station 20 needs to calculate a transmission weight in consideration of the guard interval length and pilot data arrangement, too.

Here, the operation by the base station 20 of multiplying a transmission weight for each subcarrier on the frequency domain corresponds to an operation of convoluting a time profile obtained by subjecting transmission weights to an inverse Fourier transform on the time domain. The delay profile of the channel received by the terminal device 30 becomes a temporally extended delay profile in which the time profile of transmission weight is convoluted in the original delay profile of the channel.

This embodiment provides a method of calculating a transmission weight which allows the terminal device 30 which receives an OFDM signal subjected to transmission beam forming from the base station 20 to perform channel estimation without being aware of beam forming by limiting the time length of a time profile obtained by subjecting transmission weights to an inverse Fourier transform according to a pilot data arrangement and a guard interval.

The basic principle about transmission beam forming at the base station 20 in the radio communication system 10 constructed of the base station 20 and the terminal device 30 according to this embodiment will be explained below.

Figure 2:
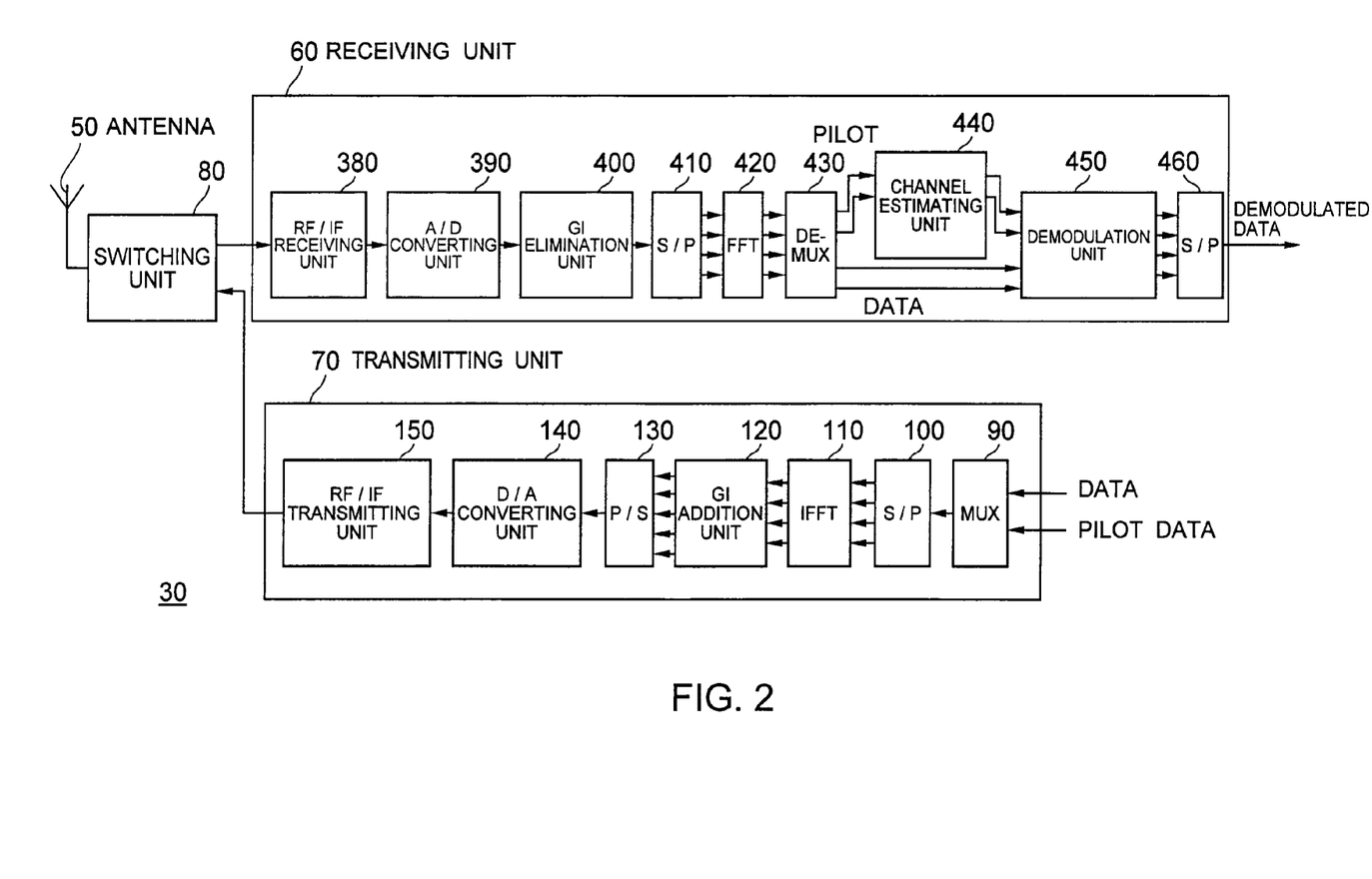
FIG. 2 shows a configuration example of a terminal device according to the embodiment.

FIG. 2 shows the configuration of the terminal device 30 according to this embodiment. The terminal device 30 is constructed of a transmitting unit 70 and a receiving unit 60, and the receiving unit 60 and the transmitting unit 70 are switched by a switching unit 80. This is equivalent to an OFDM transmitter/receiver based on a normal TDD scheme.

The operation of the transmitting unit 70 at the terminal device 30 will be explained below.

In the terminal device 30, an MUX unit 90 multiplexes data and pilot data which is known data and an S/P converting unit 100 maps the multiplexed data to OFDM subcarriers. Next, an IFFT processing unit 110 applies an inverse Fourier transform to the subcarriers to which the data and pilot data have been mapped to obtain an OFDM symbol on the time domain. Next, a GI addition unit 120 adds a guard interval (cyclic prefix) to the head of the OFDM symbol, a D/A converting unit 140 converts the OFDM symbol to an analog signal and transmits the analog signal from an antenna 50 through an RF/IF transmitting unit 150.

Figure 3:
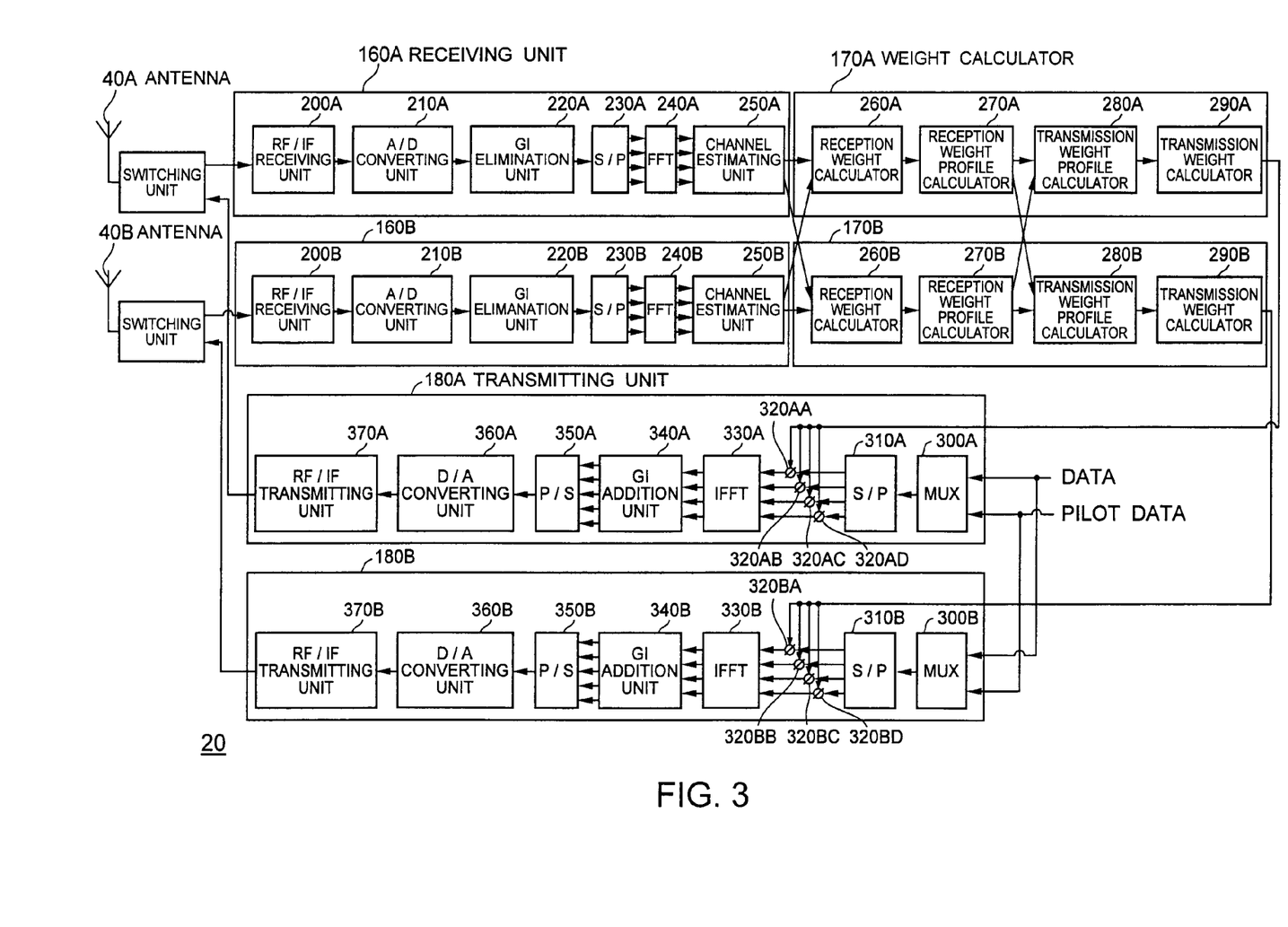
FIG. 3 shows a configuration example of a base station according to the embodiment.

FIG. 3 shows the configuration of the base station 20 according to this embodiment. The base station 20 is provided with a plurality of antennas 40A and 40B, includes receiving units 160A and 160B, weight calculators 170A and 170B and transmitting units 180A and 180B corresponding to the respective antennas. Receiving units 160A and 160B, and transmitting units 180A and 180B are switched by the switching units 190A and 190B.

The operation of the receiving unit 160A of the base station 20 will be explained below.

The OFDM signal transmitted from the terminal device 30 is received at the antenna 40A, passed through an RF/IF receiving unit 200A and converted to a digital signal at an A/D converting unit 210A. Next, the digital signal is rid of the guard interval (cyclic prefix) which has been added to the OFDM symbol at a GI elimination unit 220A. An FFT processing unit 240A applies Fourier transform (FFT) processing to data samples corresponding to 1 OFDM symbol accumulated at an S/P converting unit 230A collectively and outputs frequency data for each subcarrier.

The channel estimating unit 250A estimates a channel between the terminal device 30 and the antenna 40A using pilot data transmitted from the terminal device 30. More specifically, the channel estimating unit 250A calculates a delay profile which is a time response of the channel and a frequency response for each subcarrier equivalent to a Fourier transform thereof. Furthermore, the channel estimating unit 250A estimates a noise interference level for each subcarrier. In this way, the channel estimating unit 250A generates a channel estimated value.

The operation of the weight calculator 170A of the base station 20 will be explained using FIG. 3 below.

A reception weight calculator 260A calculates a reception weight by which each subcarrier is multiplied using the frequency response and the noise interference level (channel estimated value) for each subcarrier calculated by the channel estimating unit 250A, 250B of each antenna 40A, 40B. Though not shown, when demodulating the data transmitted from the terminal device 30, a signal resulting from multiplying respective subcarriers by respective reception weights and adding them up is demodulated.

As an example of calculating a reception weight, the following method may be used.

As a first example of the method of calculating a reception weight, a complex number value at which a signal-to-noise interference power ratio after combining reaches a maximum is used as a reception weight for each subcarrier.

As a second example of the method of calculating a reception weight, assuming that a common reception weight is used for each of a plurality of subcarrier groups respectively, 1 subcarrier group consisting of a plurality of subcarriers, a complex number value at which an average signal-to-noise interference power ratio of the subcarrier group after combining reaches a maximum is used as a reception weight for the subcarrier group.

As a third example of the method of calculating a reception weight, a complex number value having magnitude of 1 of a phase opposite to that of a channel estimated value of each subcarrier is used as a reception weight of each subcarrier so that each subcarrier is combined in phase.

As a fourth example of the method of calculating a reception weight, the reciprocal of a channel estimated value of each subcarrier is used as a reception weight of each subcarrier so as to cancel out a channel response for each subcarrier.

As a fifth example of the method of calculating a reception weight, a complex number value that forms null for a specific interference signal included in each subcarrier is used as a reception weight for each subcarrier.

Figure 4:
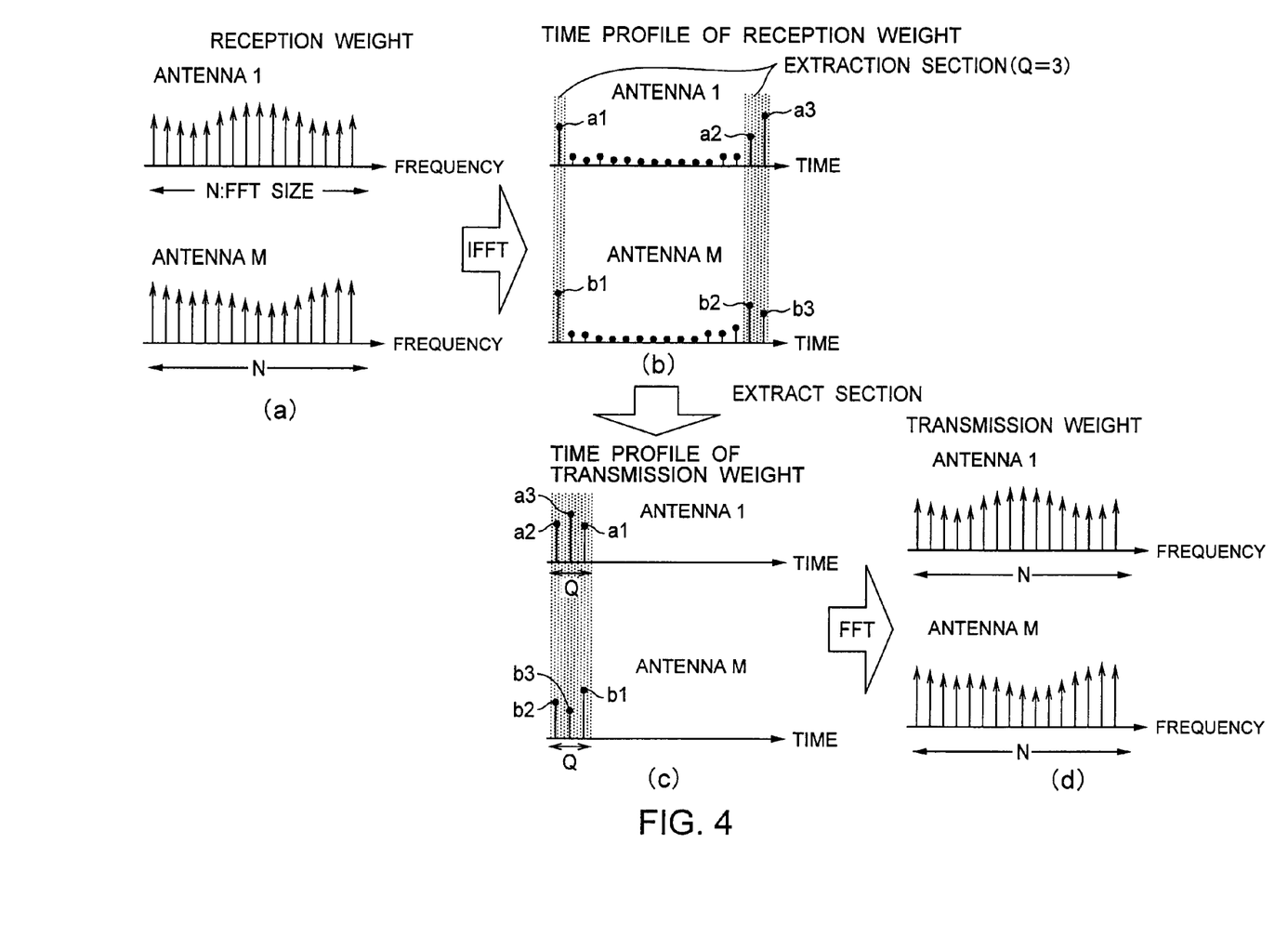
FIG. 4 shows an example of a method of calculating a transmission weight according to the embodiment.

Next, a reception weight profile calculator 270A applies an inverse Fourier transform (IFFT) to the calculated reception weights on the frequency domain and thereby calculates a time profile of the reception weight (reception weight time profile) (FIGS. 4(A) and (B)). When the number of subcarriers for calculating reception weights is different from the size of the inverse Fourier transform, a minimum square error estimation method or the like may also be used as the method of calculating a time profile of reception weight in addition to the inverse Fourier transform.

A transmission weight profile calculator 280A calculates a time profile of transmission weight which is a time response of transmission weights by which the subcarriers of the OFDM signal to be transmitted are multiplied. The transmission weight profile calculator 280A processes the time profile of reception weight which is an input signal and outputs a time profile of transmission weight whose time length is limited. The transmission weight profile calculator 280A extracts a certain continuous section (Q samples) from the inside of the time profile of reception weight and outputs the section as a time profile of transmission weight (FIGS. 4(B) and (C)). Since the time profile is assumed to be periodic from the standpoint of the nature of an inverse Fourier transform, when Q samples are extracted, they are extracted assuming that the end and the beginning of the time profile of reception weight are linked together. Furthermore, the extraction section is common to all antennas.

A transmission weight calculator 290A receives the time profile of transmission weight calculated by the transmission weight profile calculator 280A as input, applies a Fourier transform to the time profile of transmission weight, calculates and outputs a transmission weight by which each subcarrier is multiplied on the frequency domain (FIGS. 4(C) and (D)).

Figure 5:
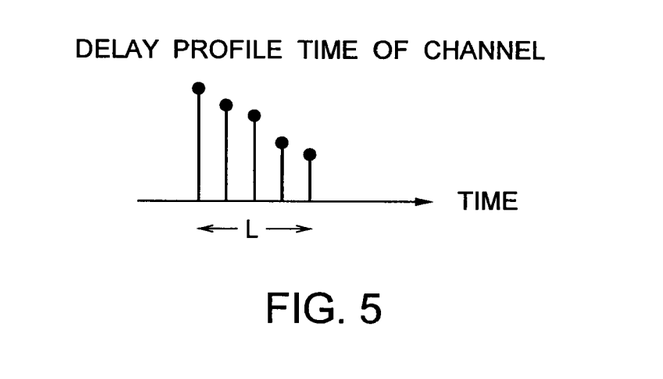
FIG. 5 shows an example of a delay profile of a channel.
Figure 6:
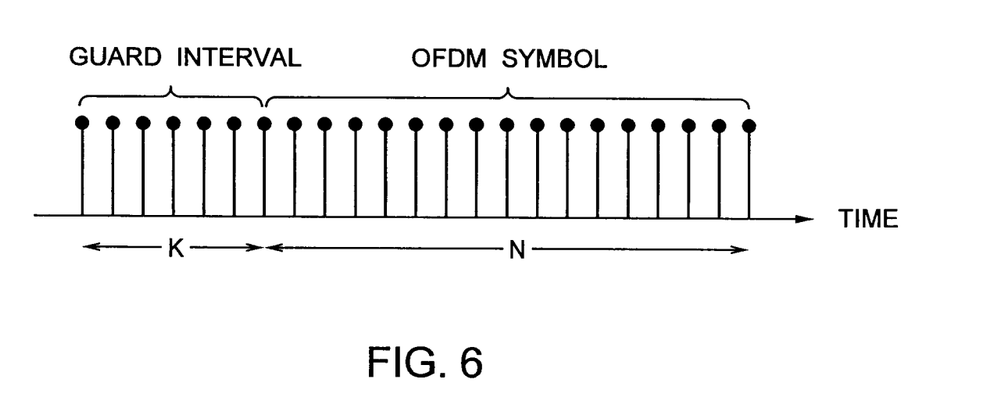
FIG. 6 shows a configuration example of an OFDM symbol according to the embodiment.
Figure 7:
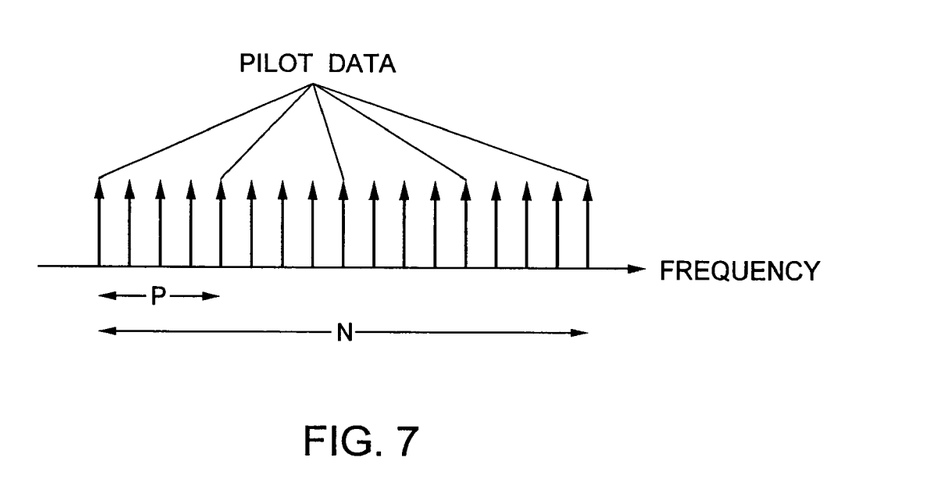
FIG. 7 shows an example of subcarrier arrangement of pilot data according to the embodiment.

The method of determining the length Q of the extraction section will be explained below using FIGS. 5 to 7.

As a first example of determining the length of the extraction section, the value of Q is determined according to a delay profile of a channel and a guard interval of an OFDM signal to be transmitted. As shown in FIG. 5 and FIG. 6, when the delay profile length of the channel is L [samples] and the guard interval length is K [samples], suppose Q=K−L+1 [samples]. Selecting such a value of Q causes the delay profile length of the OFDM signal received by the terminal device 30 to become K [samples], allowing the delay profile length to fall within the range of the guard interval length. Here, "Q" needs only to be equal to or less than K−L+1, and in this case, the delay profile length of the OFDM signal received by the terminal device 30 can fall within the range of the guard interval length.

As a second example of determining the length of the extraction section, the value of Q is determined according to the subcarrier interval of pilot data of an OFDM signal to be transmitted and a delay profile of the channel. As shown in FIG. 6 and FIG. 7, when the size of the OFDM symbol to be transmitted is N [samples] and a pilot subcarrier interval is P, the transmission weight profile calculator 280A assumes Q=N/P−L+1 [samples]. Selecting such a value of Q causes the delay profile length of the OFDM signal received by the terminal device 30 to become N/P [samples], making channel estimation possible without provoking aliasing of a delay profile due to the fact that a pilot is inserted every P subcarriers. Here, "Q" only needs to be equal to or less than N/P−L+1, and in this case, the delay profile length of the OFDM signal received by the terminal device 30 falls to or below N/P, making channel estimation possible without provoking aliasing of the delay profile. Next, an example of the method of determining an extraction section in the transmission weight profile calculator 280A will be explained below.

As a first example of determining an extraction section, a section is selected in such a way that total electric power resulting from summing up electric power of the time profile included in the extracted section reaches a maximum (FIG. 4(B)).

As a second example of determining an extraction section, a section is selected in such a way that when a time profile included in the extracted section is Fourier transformed into a weight for each subcarrier, the total electric power of all the subcarriers after combining based on the weight of each subcarrier reaches a maximum.

In the first and second examples of determining an extraction section, it is also possible to normalize a time profile included in the section extracted for each antenna in such a way that total electric power becomes 1.

The operation of the transmitting unit 180A of the base station 20 will be explained below.

In the transmitting unit 180A, multipliers 320AA to 320AD multiply data and the pilot data (transmission signal) mapped to subcarriers by a MUX unit 300A and an S/P converting unit 310A by the transmission weight calculated by the transmission weight calculator 290A for each subcarrier.

In the transmitting unit 180A, an IFFT processing unit 330A applies an inverse Fourier transform to the subcarriers multiplied by the transmission weights and transforms the subcarriers into OFDM symbol on the time domain. Next, a GI addition unit 340A adds a guard interval (cyclic prefix) to the head of the OFDM symbol and a P/S converting unit 350A then converts the OFDM symbol from parallel to serial and a D/A converting unit 360A converts the signal to an analog signal and transmits the analog signal from the antenna 40A through an RF/IF transmitting unit 370A.

The operation of the receiving unit 60 of the terminal device 30 will be explained below.

The OFDM signal transmission beam-formed and transmitted from the base station 20 is received by the antenna 50 as shown in FIG. 2, passed through an RF/IF receiving unit 380 and converted to a digital signal at an A/D converting unit 390. Next, the digital signal is rid of the guard interval (cyclic prefix) added to the OFDM symbol at a GI elimination unit 400. An FFT processing unit 420 applies Fourier transform (FFT) processing to data samples corresponding to 1 OFDM symbol accumulated in an S/P converting unit 410 collectively and outputs frequency data for each subcarrier. A DEMUX unit 430 separates subcarriers to which pilot data is mapped from subcarriers to which data is mapped. A channel estimating unit 440 estimates the channel transmission beam-formed from the base station 20 and combined at the antenna 50 from the pilot data. The channel estimating unit 440 estimates the time length of the delay profile of the channel as a guard interval length "K" or "1/P" of the OFDM symbol. A demodulation unit 450 can perform data demodulation using the channel estimated value estimated at the channel estimating unit 440.

Figure 8:
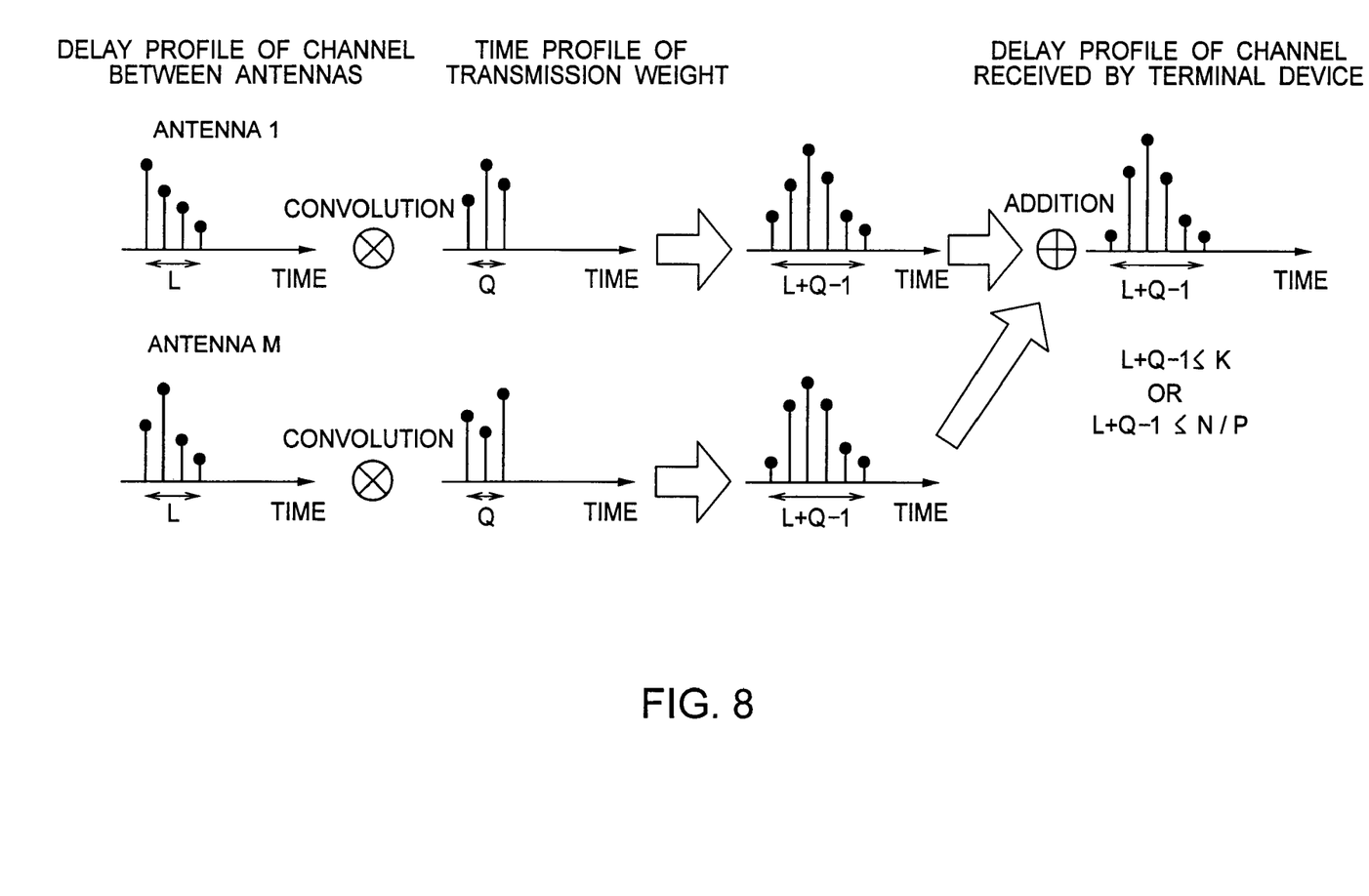
FIG. 8 shows an example of a delay profile of a channel subjected to transmission beam forming according to the embodiment.

FIG. 8 shows a change of a delay profile of the channel from the base station 20 to the terminal device 30 through transmission beam forming at the base station 20. As shown in the figure, when the delay profile length of the channel between the antennas 40A and 40B of the base station 20 and the terminal device 30 is "L", the time profile length of transmission weight at the base station 20 is set to "Q" using the above described method and as shown in the figure, the channel affected by transmission beam forming received by the terminal device 30 becomes one resulting from convoluting the delay profiles at the antennas 40A and 40B and the time profile of transmission weight and summing them up for all the antennas.

When "Q" is assumed to be equal to or less than K−L+1, the delay profile length at the terminal device 30 falls within the guard interval length "K" of the OFDM signal and the terminal device 30 can perform channel estimation (delay profile estimation) within the range of the guard interval. On the other hand, when "Q" is assumed to be equal to or less than N/P−L+1, the delay profile length at the terminal device 30 falls within the range of 1/P ("P" is the pilot subcarrier interval) of the OFDM symbol, and therefore channel estimation (delay profile estimation) can be performed without being affected by aliasing at the terminal device 30.

As described above, this embodiment limits the time profile length of transmission weight according to the guard interval and the pilot arrangement of the OFDM signal and performs transmission beam forming by applying a transmission weight resulting from Fourier transforming on a time profile of transmission weight, and can thereby limit the delay profile of the channel subjected to transmission beam forming to within a certain time and allows the terminal device 30 to perform channel estimation without being aware of the transmission beam forming or without being affected by aliasing within the range of the guard interval.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus provided with a plurality of antennas and using a multicarrier transmission scheme as a transmission scheme, comprising:

a plurality of channel estimating units configured to be arranged correspondingly to the plurality of the antennas and configured to generate a channel estimated value for each antenna by performing channel estimation using a received signal acquired by each antenna;

a plurality of reception weight calculators configured to calculate reception weights by which subcarriers assigned the received signal of each antenna are to be multiplied using a set of the channel estimated values generated by the plurality of channel estimating units;

a plurality of reception weight profile calculators configured to calculate a reception weight time profile for each antenna by converting the reception weights calculated for each antenna to data on a time domain;

a plurality of transmission weight profile calculators configured to generate a transmission weight time profile for each antenna by extracting a certain section of the reception weight time profile calculated for each antenna;

a plurality of transmission weight calculators configured to calculate transmission weights by which subcarriers assigned a transmission signal for each antenna are to be multiplied by converting the transmission weight time profile calculated for each antenna to data on a frequency domain; and a plurality of transmitting units configured to multiply subcarriers assigned the transmission signal for each antenna by the transmission weights calculated for each antenna and transmit subcarriers multiplied by the transmission weights through each antenna.

2. The apparatus according to claim 1, wherein the transmission weight profile calculators perform extraction in such a way that a time length of a section to be extracted falls to or below N/P−L+1, where "P" is a subcarrier interval at which pilot data is inserted ("P" is an integer equal to or greater than 2), "L" is a delay profile length and "N" is a symbol length.

3. The apparatus according to claim 1, wherein the transmission weight profile calculators perform extraction in such a way that a time length of a section to be extracted falls to or below K−L+1, where "K" is a guard interval length of the transmission signal, "L" is a delay profile length and "N" is a symbol length.

4. The apparatus according to claim 1, wherein the transmission weight profile calculators select a section to be extracted in such a way that total electric power resulting from summing up electric power of reception weight time profile included in the section to be extracted reaches a maximum.

5. The apparatus according to claim 1, wherein the transmission weight profile calculators perform a Fourier transform on reception weight time profile included in a section to be extracted to generate weights of the subcarriers and selects the section to be extracted in such a way that total electric power obtained in a case of combining signals of subcarriers corresponding between the received signals of each antenna based on generated weights of the subcarriers reaches a maximum.

6. The apparatus according to claim 1, wherein the reception weight calculators get a complex number value at which a signal-to-noise power ratio in a case of combining signals of subcarriers corresponding between the received signals of each antenna reaches a maximum as the reception weight of each subcarrier.

7. The apparatus according to claim 1, wherein the reception weight calculators get a complex number value at which an average signal-to-noise power ratio in a case of combining signals of subcarriers corresponding between the received signals of each antenna reaches a maximum in each of subcarrier groups having subcarriers more than one, as common reception weight to subcarriers included in each subcarrier group.

8. The apparatus according to claim 1, wherein the reception weight calculators get a complex number value having magnitude of 1 with a phase opposite to that of the channel estimated value of each subcarrier as the reception weight of each subcarrier so that each subcarrier can be combined in phase between the received signals of each antenna.

9. The apparatus according to claim 1, wherein the reception weight calculators get a reciprocal of the channel estimated value of each subcarrier as the reception weight of each subcarrier so that a channel response for each subcarrier can be canceled out.

10. The apparatus according to claim 1, wherein the reception weight calculators get such a complex number value as to form null for a specific interference signal included in each subcarrier as the reception weight of each subcarrier.

11. A communication method performed in a communication apparatus provided with a plurality of antennas and using a multicarrier transmission scheme as a transmission scheme, comprising:
generating a channel estimated value for each antenna by performing channel estimation using a received signal acquired by each antenna;
calculating reception weights by which subcarriers assigned the received signal of each antenna are to be multiplied using a set of the channel estimated values for the antennas;
calculating a reception weight time profile for each antenna by converting the reception weights calculated for each antenna to data on a time domain;
generating a transmission weight time profile for each antenna by extracting a certain section of the reception weight time profile calculated for each antenna;
calculating transmission weights by which subcarriers assigned a transmission signal for each antenna are to be multiplied by converting the transmission weight time profile calculated for each antenna to data on a frequency domain; and
multiplying subcarriers assigned the transmission signal for each antenna by the transmission weights calculated for each antenna and transmit subcarriers multiplied by the transmission weights through each antenna.

12. The method according to claim 11, wherein the calculating a reception weight time profile includes performing extraction in such a way that a time length of a section to be extracted falls to or below N/P−L+1, where "P" is a subcarrier interval at which pilot data is inserted ("P" is an integer equal to or greater than 2), "L" is a delay profile length and "N" is a symbol length.

13. The method according to claim 11, wherein the calculating a reception weight time profile includes performing extraction in such a way that a time length of a section to be extracted falls to or below K−L+1, where "K" is a guard interval length of the transmission signal, "L" is a delay profile length and "N" is a symbol length.

14. The method according to claim 11, wherein the calculating a reception weight time profile includes selecting a section to be extracted in such a way that total electric power resulting from summing up electric power of reception weight time profile included in the section to be extracted reaches a maximum.

15. The method according to claim 11, wherein the calculating a reception weight time profile includes performing a Fourier transform on the reception weight time profile included in a section to be extracted to generate weights of the subcarriers and selects the section to be extracted in such a way that total electric power obtained in a case of combining signals of subcarriers corresponding between the received signals of each antenna based on generated weights of the subcarriers reaches a maximum.

16. The method according to claim 11, wherein the calculating reception weights includes getting a complex number value at which a signal-to-noise power ratio in a case of combining signals of subcarriers corresponding between the received signals of each antenna reaches a maximum as the reception weight of each subcarrier.

17. The method according to claim 11, wherein the calculating reception weights includes getting a complex number value at which an average signal-to-noise power ratio in a case of combining signals of subcarriers corresponding between the received signals of each antenna reaches a maximum in each of subcarrier groups having subcarriers more than one, as common reception weight to subcarriers included in each subcarrier group.

18. The method according to claim 11, wherein the calculating reception weights includes getting a complex number value having magnitude of 1 with a phase opposite to that of the channel estimated value of each subcarrier as the reception weight of each subcarrier so that each subcarrier can be combined in phase between the received signals of each antenna.

19. The method according to claim 11, wherein the calculating reception weights includes getting a reciprocal of the channel estimated value of each subcarrier as the reception weight of each subcarrier so that a channel response for each subcarrier can be canceled out.

20. The method according to claim 11, wherein the calculating reception weights includes getting such a complex number value as to form null for a specific interference signal included in each subcarrier as the reception weight of each subcarrier.

* * * * *